United States Patent [19]

Alberino et al.

[11] 4,338,428
[45] Jul. 6, 1982

[54] NOVEL POLYAMIDES FROM KETENE-AMINALS

[75] Inventors: Louis M. Alberino, Cheshire; Dale F. Regelman, Wallingford, both of Conn.

[73] Assignee: The Upjohn Company, Kalamazoo, Mich.

[21] Appl. No.: 292,872

[22] Filed: Aug. 14, 1981

[51] Int. Cl.³ .................... C08G 18/32; C08G 18/38; C08G 69/08
[52] U.S. Cl. ................................ 528/73; 264/328.1; 528/71; 528/75; 528/310; 528/327
[58] Field of Search .................... 528/73, 75, 310, 327

[56] References Cited
U.S. PATENT DOCUMENTS

2,743,247  4/1956  Lotz ................................ 528/310
4,027,059  5/1977  Koons .............................. 528/75
4,069,211  1/1978  Nishita et al. .................. 528/75

OTHER PUBLICATIONS

Journal of Organic Chem., 29, 2932 (1964), D. H. Clemens et al.

Primary Examiner—H. S. Cockeram
Attorney, Agent, or Firm—James S. Rose; Denis A. Firth

[57] ABSTRACT

Novel polyketene-aminal polyamides are disclosed which have the following recurring unit

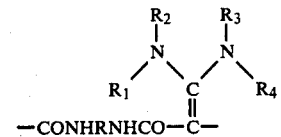

wherein R is a divalent hydrocarbon radical, $R_1$, $R_2$, $R_3$, and $R_4$ when taken separately are independently selected from the group consisting of lower alkyl, aralkyl, and cycloalkyl, and when taken together as $R_1$ with $R_2$ and $R_3$ with $R_4$ with the respective nitrogen atoms to which they are attached represent independently a heterocyclic group having from 5 to 7 ring atoms.

The polyamides are prepared by reacting together the appropriate diisocyanate $[R(NCO)_2]$ and appropriate ketene-aminal to form the polymer directly without the evolution of any by-products or volatiles.

The novel polymers are thermoplastic and can be formed or shaped using any of the techniques known to those skilled in the thermoplastic polymer art.

18 Claims, No Drawings

NOVEL POLYAMIDES FROM KETENE-AMINALS

BACKGROUND OF THE INVENTION

1. Field of the Invention

This invention relates to polyamide polymers and is more particularly concerned with novel polyamides having a ketene-aminal as a recurring unit in the polymer chain and the novel preparation of said polyamides.

2. Description of the Prior Art

Various types of polyamide polymers are known to those skilled in the art, see for example The Encyclopedia of Polymer Science and Technology, Vol. 10, pp 347–593, 1969, Interscience Publishers, New York, N.Y. The various kinds of recurring units disclosed therein all share the common feature of being linked by the recurring carbonamide group

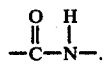

Clemens et al (J. of Organic Chem. 29, 2932 [1964]) have reported the formation of monoamides and diamides of a ketene-aminal by the reactions of 1,1-di(1-piperidinyl)ethylene with 1 and 2 moles respectively of alkyl or aryl monoisocyanates. The objective of this reported work was the study of the nuclear magnetic resonance spectra of the various amide ketene-aminals and their corresponding amidinium salts formed by the reaction of the ketene-aminals with acids.

We have now discovered a novel class of thermoplastic polyketene-aminal based polyamides defined below wherein the ketene-aminal grouping is a regular recurring part of the polymer backbone.

The polyamides in accordance with the present invention are easily prepared by a novel direct condensation polymerization process wherein no by-products are produced.

Unexpectedly, the polymerization can be effected under very mild conditions but, even more unexpectedly, the polymerization occurs very rapidly to offer one of the fastest, if not the fastest, means for preparing a polymer having carbonamide linkages.

SUMMARY OF THE INVENTION

This invention comprises a polyamide having the recurring unit

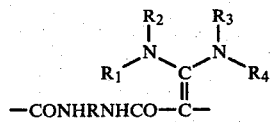

wherein R is a divalent hydrocarbon radical, $R_1$, $R_2$, $R_3$, and $R_4$ when taken separately are independently selected from the group consisting of lower alkyl, aralkyl, and cycloalkyl, and, when taken together as $R_1$ with $R_2$ and $R_3$ with $R_4$ with the respective nitrogen atoms to which they are attached, represent independently heterocyclic groups having from 5 to 7 ring atoms.

The invention also comprises a process for the preparation of the above polyamides (I) comprising bringing together a ketene-aminal having the formula

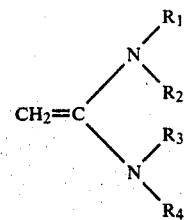

and an organic diisocyanate $R(NCO)_2$ (III) wherein said (II) and (III) are present in substantially stoichiometric proportions. $R_1$, $R_2$, $R_3$, $R_4$, and R have the same significance as set forth for (I) above.

The term "divalent hydrocarbon radical" means the radical obtained by removing two hydrogen atoms from a parent hydrocarbon having a carbon atom content of from 4 to 18 inclusive. Included in this definition is alkylene, cycloalkylene, and arylene.

The term "alkylene" means a radical having from 6 to 18 carbon atoms, inclusive, such as 1,6-hexylene, 1,7-heptylene, 1,8-octylene, 1,9-nonylene, 1,10-decylene, 1,11-undecylene, 1,12-dodecylene, 1,13-tridecylene, 1,14-tetradecylene, 1,15-pentadecylene, 1,16-hexadecylene, 1,17-heptadecylene, 1,18-octadecylene, and various isomeric forms such as 2,2,4- and 2,4,4-trimethylhexylene, and the like.

The term "cycloalkylene" means a divalent radical derived from a cycloalkane having from 4 to 8 ring carbon atoms, inclusive, such as 1,3-cyclobutylene, 1,3-cyclopentylene, 1-methyl-2,4-cyclopentylene, 1,3-cyclohexylene, 1,4-cyclohexylene, 1-methyl-2,4-cyclohexylene, 1,3,3-trimethyl-1-methylenecyclohexylene-3, methylene-bis(cyclohexylene-1,4), 1,4-cycloheptylene, 1-methyl-3,6-cycloheptylene, 1,4-cyclooctylene, and the like.

The term "arylene" means a divalent radical derived from an aromatic hydrocarbon having from 6 to 18 carbon atoms, inclusive, such as phenylene, tolylene, xylylene, naphthylene, diphenylylene, and radicals having the formula

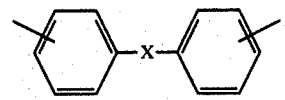

wherein X is selected from the group consisting of $-SO_2-$, $-CO-$, $-O-$, and lower alkylene from $C_1$ to $C_4$, such as 4,4'-oxydiphenylene, 4,4'-sulfonyldiphenylene, 4,4'-carbonyldiphenylene, 4,4'-isopropylidenediphenylene, 4,4'-methylenediphenylene, 2,4'-methylenediphenylene, 3,3'-dimethyl-4,4'-methylenediphenylene, 3,3'-methylenediphenylene, and the like, and mixtures thereof.

The term "lower alkyl" means alkyl having from 1 to 8 carbon atoms, inclusive, such as methyl, ethyl, propyl, butyl, pentyl, hexyl, heptyl, octyl, and isomeric forms thereof.

The term "aralkyl" means moieties having from 7 to 12 carbon atoms, inclusive, such as benzyl, phenethyl, phenylpropyl, benzhydryl, naphthylmethyl, and the like.

The term "cycloalkyl" means moieties having from 4 to 8 carbon atoms, inclusive, such as cyclobutyl, cyclopentyl, 3-methylcyclopentyl, cyclohexyl, 4-methylcyclohexyl, cycloheptyl, 3-methylcycloheptyl, 3,4-dimethylcycloheptyl, cyclooctyl, and the like.

The term "heterocyclic group having from 5 to 7 ring atoms" means a heterocyclic radical containing at least the basic valence ring nitrogen and optionally containing one or more additional hetero atoms such as nitrogen, oxygen and sulfur. Illustrative of such groups are N-pyrrolidinyl, N-oxazolidinyl, N-thiazolidinyl, N-piperidinyl, N-(4-methylpiperidinyl), N-morpholinyl, N-(4-methylpiperazinyl), N-(4-ethylpiperazinyl), N-hexahydroazepinyl, and the like.

The divalent hydrocarbon R and the radicals $R_1$, $R_2$, $R_3$, and $R_4$ can be substituted by one or a plurality of substituents provided the latter are not reactive with isocyanate or otherwise interfere with the polymerization reaction between (II) and (III). Illustrative but not limiting of such inert substituents are halo, i.e. chloro, bromo, fluoro, and iodo; and alkoxy from 1 to 8 carbon atoms, inclusive, such as methoxy, ethoxy, etc.; and the like.

It will be understood by those skilled in the art that when the radicals $R_1$ and $R_2$ are different from the radicals $R_3$ and $R_4$, either taken singly or when taken together with their respective nitrogen atoms, that each recurring unit can occur in one or the other of two geometric isomer forms depending on which side of the double bond the respective radicals extend. However, when $R_1$, $R_2$, $R_3$, and $R_4$ are all the same, including the same heterocyclic groups, then no such geometric isomers exist in the recurring units (I).

A preferred class of divalent hydrocarbon radicals (R) is comprised of the arylene radicals defined above.

A preferred group of radicals comprises 2,4-tolylene, 2,6-tolylene, mixtures of 2,4-, and 2,6-tolylene, 4,4'-methylenediphenylene, 2,4'-methylenediphenylene, and mixtures of the above in any proportions.

Preferred classes of radicals $R_1$, $R_2$, $R_3$, and $R_4$ are those wherein all radicals are the same and are lower alkyl and those wherein $R_1$ and $R_2$, and $R_3$ and $R_4$ are taken together with their respective nitrogen atoms to form the same heterocyclic groups having from 5 to 7 ring atoms. The most preferred class comprises the latter nitrogen heterocycles.

Preferred species of the radicals are those wherein $R_1$, $R_2$, $R_3$, and $R_4$ are methyl, ethyl, propyl, and butyl, and the nitrogen heterocycles comprise N-pyrrolidinyl, N-morpholinyl, and or N-piperidinyl radicals.

The ketene-aminal based polyamides in accordance with the present invention can be compression molded, injection molded, cast as films and foils from organic solvent solutions of said polyamides, or applied as coatings in solution form on various substrates by dipping, brushing, and the like with subsequent solvent removal.

The shaped solid forms of the present polymers can be used in bushings, seal faces, electric insulators, compressor vanes and impellers, piston rings, gears, brake lining, clutch faces, and the like. Also the quaternized basic resins obtained from the reactions of the present polyamides with acidic materials (e.g. hydrohalic acids) can be used as anion exchange resins.

DETAILED DESCRIPTION OF THE INVENTION

The ketene-aminal based polyamides in accordance with the present invention have the recurring unit defined in formula (I) above.

The polyamides in accordance with the present invention may contain minor amounts of units other than (I) provided the major proportion of the recurring units are in accordance with formula (I). By minor amount is meant less than about 20 percent by weight based on total polymer weight.

The polyamides are obtained via the interaction of the appropriate ketene-aminal (II) and diisocyanate (III) according to the following equation

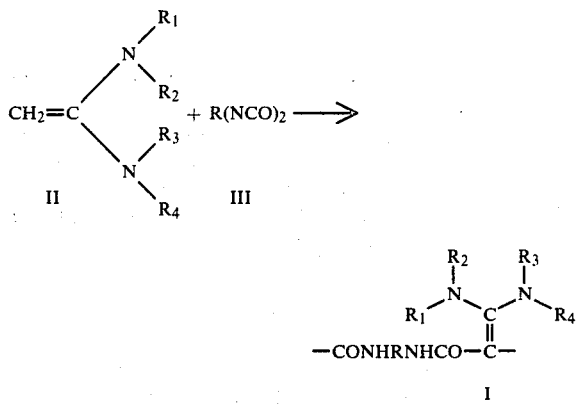

wherein R, $R_1$, $R_2$, $R_3$, and $R_4$ have the significance set forth above.

Conveniently, the ketene-aminal reacts as a difunctional ingredient wherein the methylene carbon is capable of reacting with two isocyanate groups in forming two amide linkages shown in (I). That is to say, the equivalent weight of (II) is half the molecular weight.

The diisocyanate and ketene-aminal are brought together in substantially stoichiometric proportions and under anhydrous conditions to achieve the formation of (I).

The term "substantially stoichiometric proportions" has the usual significance known to those skilled in the condensation polymer art, and, generally speaking, means that (II) and (III) are employed in equivalent amounts or equimolar proportions in order to reach the maximum polymer molecular weight. Included in the above term are minor deviations from absolute stoichiometric proportions which are purposely introduced in either (II) or (III) in order to overcome the effects of slight impurities in either monomer.

The polymerization process should be carried out under essentially anhydrous conditions in order to prevent side reactions between (II) or (III) and moisture which would detract from the overall process in accordance with the invention. Basically, these conditions are achieved by using any standard and suitable means known to those skilled in the art for the exclusion of water or atmospheric moisture from the site of the reaction such as a closed but vented polymer reaction flask or kettle, or under an atmosphere of inert gas such as nitrogen or argon, and the like.

Generally speaking, the reactants are liquids, and, accordingly they can be easily mixed together to effect the polymerization. In the event one of the reactants is a solid, then it can be readily dissolved in the other to allow the polymerization to proceed.

The facile condensation of (II) and (III) proceeds to polyamide without evolution of any by-products (e.g. water, hydrogen halides, carbon dioxide, etc.). Accordingly, (II) and (III) can be brought together by mixing in a mold (for example using a reaction injection molding machine) and one can thereby obtain a molded polyamide article directly.

Surprisingly, the polymerization process can be carried out in the presence or absence of a solvent, the latter process being already referred to above in connection with the direct molding of the reactants.

Alternatively, and in a preferred embodiment of the present process, the reactants are brought together in an inert solvent. By the term "inert solvent" is meant a solvent which will dissolve the reactants but which will not react with either (II) or (III) or otherwise interfere with the desired course of the reaction. Typical of the solvents which can be employed are the aromatic solvents such as benzene, toluene, xylene, chlorobenzene, dichlorobenzene, nitrobenzene, and the like; halogenated solvents such are chloroform, bromoform, carbon tetrachloride, ethylene dichloride, trichloroethylene, tetrachloroethane, and the like; dipolar aprotic solvents such as N,N-dimethylformamide, N,N-dimethylacetamide, N-methylpyrrolidone, dimethylsulfoxide, tetramethylenesulfone, and the like.

The use of a solvent not only facilitates the polymerization reaction per se but aids in the handling of the monomers, and, particularly the polymer products (I). The dipolar aprotic solvents are the most efficient solvents for the preparation of the polyamide in accordance with the present invention, and, therefore, are preferred as a class. Most preferred within this class are tetramethylenesulfone, dimethylacetamide, and dimethylformamide.

Surprising are the mild conditions under which the present process can be carried out. Advantageously, the reaction, regardless of the presence or absence of solvent, is carried out at a temperature of from about 20° C. to about 150° C., preferably from about 40° C. to about 100° C., and most preferably about 40° C. to about 80° C. Generally speaking, the use of a solvent, particularly the dipolar aprotic solvents, will result in lower reaction temperatures but ones which still fall within the above ranges.

The progress of the polymerization can be followed by any of the routine analytical procedures employed in the art for such purposes and well known to the art skilled. Illustrative of such procedures are infrared spectral analysis, proton and carbon-13 nuclear magnetic resonance analysis and the like. A preferred method is infrared spectral analysis which can be used to detect the presence or absence of the isocyanate function. Thereby, the termination of the polymerization can be determined.

One of the most surprising and unexpected features and advantages of the present invention, as noted above, is the rapidity with which the polymerization will occur. With the appropriate choice of solvent, reactants, etc., some of the polymerizations in accordance with the present invention can be completed in minutes. This feature can be particularly advantageous when carrying out the polymerization in molds (i.e. using RIM techniques and the like).

Upon completion of the reaction the polymer can be isolated using any appropriate means known to those skilled in the art for isolating polymer products. In the event that no solvent is employed, the solid or molten product can be removed directly from the resin flask or reaction kettle. Preferably, a non-solvent for the polymer can be mixed with the product either in the reaction flask or in a blender or other like means for mixing the two thereby resulting in the production of the polymer in finely divided solid form.

Illustrative of non-solvents which can be employed are the lower alkanols such as methanol, ethanol, isopropanol, butanol, and the like; the aromatic and halogenated solvents set forth above, and the like which are capable of functioning in the role of non-solvents for the product; similarly the ketonic solvents such as acetone, methyl ethyl ketone, and the like.

Generally speaking, the polyamide will form as a particulate solid in the non-solvent from which it can be separated by filtration or other suitable means.

When the process in accordance with the present invention is carried out in a solvent, and, preferably, a dipolar aprotic solvent, the polymer is formed as a solution in said solvent. Optionally, the polymer can be left in solution to be used in any application which calls for a solution such as spraying, dipping, brushing, and the like operation.

In a preferred embodiment of the present process, the polymer is precipitated from its reaction solution simply by the addition of a non-solvent for the polymer. Any one of the classes of non-solvents discussed above may be employed for this purpose. Preferably, a lower alkanol is used as the precipitating solvent. Once the polyamide has been precipitated it can be isolated as described above.

In an unexpected advantage to flow from the present process, no catalyst is required. This feature not only is economically attractive but, additionally, it eliminates any potential problems arising from the permanent presence of a catalyst material in the finished polyamide product. Such potential problems include polymer degradation and/or hydrolysis during fabrication processes such as molding, extruding, and other like steps, particularly at elevated temperatures.

The ketene-aminals (II) defined above are for the most part known in the art and are readily prepared (see D. H. Clemens et al, cited supra and references cited therein) by reacting either ketene acetals, alkoxyacetylenes, or, and preferably, ethyl orthoacetate with an excess of the secondary amine (or amines) corresponding to $HNR_1R_2$ and/or $HNR_3R_4$ in the presence of an acid acceptor. A typical reaction is as follows $$CH_3C(OC_2H_5)_3 + \geq 2HNR_1R_2 \text{ or } \geq 2HNR_3R_4 \longrightarrow II$$

or mixtures.

Illustrative but not limiting of the ketene-aminals are 1,1-bis(dimethylamino)ethylene, 1,1-bis(diethylamino)-ethylene, 1,1-bis(dibutylamino)ethylene, 1,1-bis(dihexylamino)ethylene, 1,1-bis(dioctylamino)ethylene, 1-dimethylamino-1-diethylaminoethylene, 1,1-bis(diisopropylamino)-ethylene, 1,1-bis(diisobutylamino)ethylene, and the like; 1,1-bis(dibenzylamino)ethylene, 1,1-bis(diphenylethylamino)-ethylene, 1,1-bis(dinaphthylmethylamino)ethylene, and the like; 1,1-bis(dicyclobutylamino)ethylene, 1,1-bis(dicyclopentylamino)ethylene, 1,1-bis(dicyclohexylamino)-ethylene, 1,1-bis(dicycloheptylamino)ethylene, 1,1-bis(dicyclooctylamino)ethylene, 1-dicyclobutylamino-1-dicyclohexylaminoethylene, and the like; 1,1-bis(N-pyrrolidinyl)-ethylene, 1,1-bis(N-oxazolidinyl)ethylene, 1,1-bis(N-thiazolidinyl)ethylene, 1,1-bis(N-piperidinyl)ethylene, 1,1-bis[N-(4-methylpiperidinyl)]ethylene, 1,1-bis(N-morpholinyl)ethylene, 1,1-bis[N-4-methylpiperazinyl)]-ethylene, 1,1-bis[N-(4-ethylpiperazinyl)]ethylene, 1-N-piperidinyl-1-N-morpholinoethylene, 1,1-bis(N-hexahydroazepinyl)ethylene, and the like.

Preferred ketene-aminals are 1,1-bis(dimethylamino)ethylene, 1,1-bis(diethylamino)ethylene, 1,1-bis-(dipropylamino)ethylene, 1,1-bis(dibutylamino)ethylene, 1,1-bis(dipentylamino)ethylene, 1,1-bis(dihexylamino)-ethylene, 1,1-bis(diheptylamino)ethylene, 1,1-bis(dioctylamino)ethylene, 1,1-bis(N-pyrrolidinyl)ethylene, 1,1-bis(N-piperidinyl)ethylene, and 1,1-bis(N-morpholinyl)ethylene.

Most preferred species are the latter three heterocyclic ketene-aminals.

The diisocyanates (III) to be used in accordance with the present invention can be any of the organic diisocyanates known to those skilled in the polyurethane art and may be aliphatic, cycloaliphatic, aromatic, or heterocyclic diisocyanates such as those described by Siefken in Justus Liebigs Annalen der Chemie, 562, pages 75 to 136.

The preferred class of isocyanates is the aromatic diisocyanates.

Illustrative but not limitative of the diisocyanates are 1,6-hexamethylenediisocyanate, 1,7-heptamethylenediisocyanate, 1,8-octylenediisocyanate, 1,9-nonylenediisocyanate, 1,10-decylenediisocyanate, 1,11-undecylenediisocyanate, 1,12-dodecylenediisocyanate, 1,18-octadecylenediisocyanate, and the like; 1,3-cyclobutylenediisocyanate, 1,3-cyclopentylenediisocyanate, 1,3-cyclohexylenediisocyanate, 1,4-cycolohexylenediisocyanate, isophoronediisocyanate, 4,4'-methylenebis(cyclohexylisocyanate), and the like; 1,4-xylylenediisocyanate, 1,3-xylylenediisocyanate, 1,4-naphthalenebis(methyl isocyanate), and the like; 1,4-phenylenediisocyanate, 1,3-phenylenediisocyanate, 2,4-tolylenediisocyanate, 2,6-tolylenediisocyanate (and mixtures of 2,4-, and 2,6-tolylenediisocyanate), 1,5-naphthylenediisocyanate, 4,4'-diphenylenediisocyanate, 4,4'-diisocyanatodiphenylether, 4,4'-diisocyanatodiphenylsulfone, 2,2-(4,4'-diisocyanatophenyl)propane, 4,4'-diisocyanatobenzophenone, 4,4'-diisocyanatodiphenylmethane, 2,4'-diisocyanatodiphenylmethane, 3,3'-dimethyl-4,4'-diisocyanatodiphenylmethane, 3,3'-diisocyanatodiphenylmethane, and the like; and the liquefied methylenebis(phenyl isocyanates) obtained by reacting methylenebis(phenyl isocyanate) in varying proportions with minor amounts of one or more low molecular weight glycols, as typically disclosed in U.S. Pat. Nos. 3,394,164; 3,644,457; 3,883,571; 4,031,026; 4,115,429; 4,118,411 and 4,229,347.

A preferred group of diisocyanates includes 2,4-, and 2,6-tolylenediisocyanate and mixtures thereof, 4,4'-diisocyanatodiphenylmethane, 2,4'-diisocyanatodiphenylmethane, and mixtures of the latter two compounds with each other and or with the first two named diisocyanates.

Any of additives such as antioxidants, dyes, fire retardants, fillers, reinforcing agents and the like conventionally employed with polyamides may be added, if desired, to solutions of the polymers of the present invention in solvents of the type set forth above. Alternatively, the additives may be added to the dry powdered polymers either prior to or during processing steps such as molding, extruding, injection molding and the like.

The polyamides in accordance with this invention, when first isolated, tend to be amorphous in character but are easily annealed to a semi-crystalline to crystalline state by heating above their glass transition temperatures.

As noted above, the present process lends itself to the preparation of molded polyamide parts directly from the monomer ingredients.

The following examples describe the manner and process of making and using the invention and set forth the best mode contemplated by the inventors of carrying out the invention but are not to be construed as limiting.

EXAMPLE 1

A 50 ml. resin kettle was equipped with a stirrer, thermometer, addition funnel, and gas inlet tube. Under a positive pressure of argon gas, a 2.17 g. sample of 1,1-bis(N-piperidinyl)ethylene was added dropwise to a solution at 50° C. of 2.61 g. (0.0207 eq.) of 4,4'-methylene-bis(phenyl isocyanate) [MDI] previously dissolved in 35 ml. of tetramethylenesulfone (TMS) at 50° C. The purity of the ethylene compound (a kettle aminal) was assayed by nuclear magnetic resonance (NMR) at 92 percent which is equivalent to 2.0 g. or 0.0206 equivalent. The solution was stirred and heated at 50° C. for 2 hours.

The yellow viscous solution was poured into 400 ml. of acetone causing the precipitation of a solid suspension. After stirring for about 1 hour the suspension was filtered. The yellow solid was washed with 3×300 ml. of acetone then collected by suction filtration. The solid was dried in a vacuum oven at about 100° C. under about 1 mm of mercury pressure for 72 hours. There was thus obtained 4.51 g. of a polyamide in accordance with the present invention having the following recurring unit

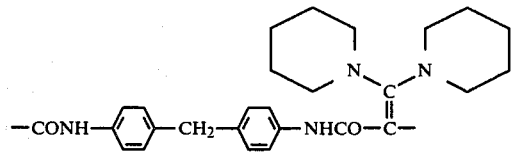

The polyamide was a yellow powder having an inherent viscosity, ηinh (0.5% at 25° C. in dimethylformamide)=0.23; Tg=70° C., determined by differential scanning calorimetry (DSC) analysis using a duPont 990 thermal analyzer equipped with the DSC module, under nitrogen, and run at a heating rate of 20 degrees/minute; Tm=215° C.; thermal gravimetric analysis (TGA) showed about 4% residual solvent content and a polymer decomposition profile of 5% wt. loss at 200° C., 10% at 250° C., and 20% at 300° C.

The above polymerization was repeated with the same reactants except that the mode of addition was reversed with the ketene aminal being dissolved in the flask in TMS at 50° C. and 2.81 g. (0.0228 eq.) or 10% excess MDI dissolved in 5 ml. TMS being added dropwise. Initially, enough of the MDI solution was added to equal 0.0207 eq. and then small increments of about 0.5% excess added until infrared (IR) analysis of an aliquot sample showed the presence of NCO. The reaction solution was stirred and heated at 70° C. for 2 hours. The resulting dark amber viscous reaction mixture was slowly poured into 600 ml. of methanol causing the precipitation of a spongy solid suspension. The solid was separated and then chopped in 600 ml. of fresh methanol in a Waring blender. The yellow solid was washed with 2×600 ml. portions of methanol and dried as described above to yield a polyamide having the above recurring unit and ηinh (0.5% at 25° C. in m-cresol)=0.24.

EXAMPLE 2

Using the same apparatus and procedure described in the second polymerization of Example 1, a 2.14 g. (0.017 eq.) sample of MDI dissolved in 10 ml. of dimethylacetamide (DMAC) was added dropwise during stirring to 1.3 g. (0.0153 eq.) of 1,1-bis(diethylamino)ethylene dissolved in 13 ml. of DMAC at 50° C. under argon. Upon completion of the addition, no residual NCO could be detected in the reaction solution. An additional 10% excess of MDI in 5 ml. of DMAC was added dropwise until NCO persisted by IR analysis. About 15% excess MDI was added overall.

The reaction solution was heated at 70° C. for 16 hours during constant stirring. The yellow solution was poured into 400 ml. methanol causing the precipitation of a yellow solid which was chopped under methanol in a Waring blender then washed with 4×400 ml. portions of methanol, collected by filtration, and dried under vacuum at 100° C. (1 mm of mercury) overnight. There was thus obtained 3.15 g. of a polyamide in accordance with the present invention having the following recurring unit

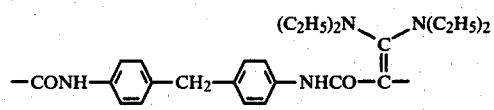

The polyamide was a yellow powder having an ηinh (0.5% at 25° C. in m-cresol)=0.20; Tg=85° C. (determined by DSC); Tm=217° C.

EXAMPLE 3

Using the same apparatus, except for a larger size resin kettle, and the procedure described in Example 2, a solution of 31.82 g. (0.252 eq.) of MDI dissolved in 40 ml. of DMAC was added dropwise during stirring to 25 g. (0.252 eq.) of 1,1-bis(N-morpholinyl)ethylene dissolved in 300 ml. of DMAC at 50° C. under argon.

After addition was completed (about 18 hours) infrared analysis on an aliquot indicated residual NCO. Enough of an additional amount of the ethylene compound dissolved in DMAC was added until IR analysis indicated no NCO (approximately 2% excess).

The yellow solution was poured into about 3000 ml. of methanol causing the precipitation of a solid which was filtered off. The yellow product was washed by stirring with methanol, collected by filtration and dried at 80° C. under 0.1 mm of mercury pressure for 18 hours. There was thus obtained 54.5 g. of a polyamide in accordance with the present invention having the following recurring unit

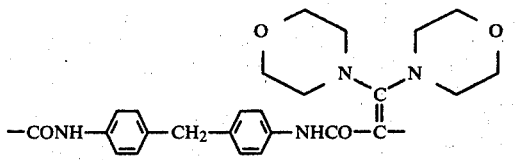

The polyamide was a yellow powder having an inherent viscosity, ηinh (0.5% at 25° C. in m-cresol)=0.56; Tg=85° C.; Tm=232° C.; carbon 13 NMR analysis was consistent with the above recurring unit.

EXAMPLE 4

Using the apparatus and procedure described in Example 3, a solution of 31.5 g. (0.25 eq.) of MDI dissolved in 50 ml. of DMAC was added dropwise during stirring to 20.75 g. (0.25 eq.) of 1,1-bis(N-pyrrolidinyl)-ethylene dissolved in 300 ml. of DMAC at 50° C. under argon.

After the addition was complete the solution was stirred at 50° C. for about 30 minutes whereupon the solution formed a gel. The gel was separated by filtration from the DMAC and soaked in methanol for three days with intermittent stirring during this period. The yellow solid was collected by suction filtration and dried at 85° C. under 0.1 mm of mercury pressure fo 18 hours. There was thus obtained 49.3 g. of a polyamide in accordance with the present invention having the following recurring unit

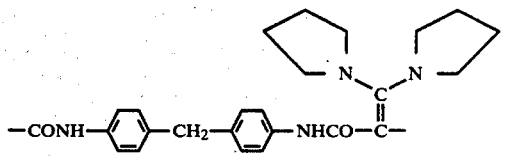

The polyamide was a yellow powder having an inherent viscosity, ηinh (0.5% at 25° C. in m-cresol)=0.54; Tg=63° C. (determined by DSC); Tm=221° C.

EXAMPLE 5

Using the apparatus and procedure described in Example 3, except that reverse addition was employed, a solution of 7.98 g. (0.081 eq.) of 1,1-bis(N-morpholinyl-)ethylene dissolved in 20 ml. of DMAC was added dropwise to 7.02 g. (0.081 eq.) of 2,4-toluenediisocyanate dissolved in 40 ml. of DMAC at ambient room temperature (about 20° C.).

After addition was completed the reaction solution was stirred until IR analysis of an aliquot showed no residual NCO. The viscous mixture was poured into 1000 ml. of methanol causing the precipitation of a yellow product. The solid was collected by filtration and washed 3× with 300 ml. portions of methanol. The yellow solid was collected by suction filtration and dried at 85° C. under 0.1 mm of mercury pressure for 18 hours. There was thus obtained 14.5 g. of a polyamide in accordance with the present invention having the following recurring unit

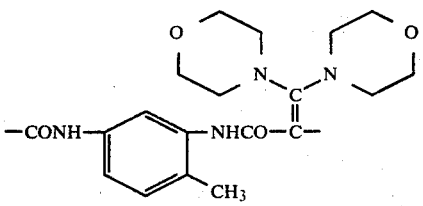

The methyl group is shown on the number 4 carbon atom of the 1,3-phenylene radical in the above formula but it can also be substituted on the number 6 carbon atom depending on which isocyanate group (2 or 4) reacts first as the polymer chain developers. Accordingly, the methyl can be randomly distributed between the two aromatic ring positions.

The polyamide was a yellow powder having an inherent viscosity, $\eta$inh (0.5% at 25° C. in DMF)=0.29.

EXAMPLE 6-11

Using the apparatus and procedure of Example 2 and the ingredients and proportions set forth therein, except that the MDI is replaced by the diisocyanates set forth in Table I, there are produced the following polyamides in accordance with the present invention

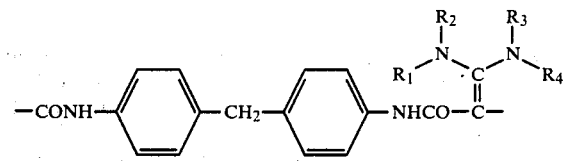

wherein R has the significance set forth in Table I.

TABLE I

| | Diisocyanate | R |
|---|---|---|
| Ex. 6 | 1,6-hexamethylene diisocyanate | $+CH_2\!\!\frac{}{}_6$ |
| Ex. 7 | 2,2,4-trimethyl-1,6-hexamethylene diisocyanate | $-CH_2C(CH_3)_2CH_2CHCH_3(CH_2\!\!\frac{}{}_2$ |
| Ex. 8 | 1,12-dodecylene diisocyanate | $+CH_2\!\!\frac{}{}_{12}$ |
| Ex. 9 | 1,3-cyclopentylene diisocyanate | ⬠ |
| Ex. 10 | 1,4-cyclohexylene diisocyanate | ⬡ |
| Ex. 11 | 4,4'-diisocyanato-diphenyl ether | ⬡—O—⬡ |

EXAMPLES 12-25

Using the apparatus and procedure of Example 2 and the ingredients and proportions set forth therein, except that the 1,1-bis(diethylamino)ethylene is replaced by the ketene-aminals set forth in Table II, there are produced the following polyamides in accordance with the present invention

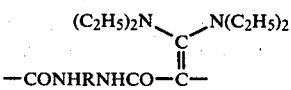

wherein $R_1$, $R_2$, $R_3$, and $R_4$ have the significance set forth in Table II.

TABLE II

| | Ketene-aminal | $R_1$ | $R_2$ | $R_3$ | $R_4$ |
|---|---|---|---|---|---|
| | | taken together | | taken together | |
| Ex. 12 | 1,1-bis(dimethylamino)ethylene | —CH$_3$ | —CH$_3$ | —CH$_3$ | —CH$_3$ |
| Ex. 13 | 1,1-bis(dibutylamino)ethylene | —C$_4$H$_9$ | —C$_4$H$_9$ | —C$_4$H$_9$ | —C$_4$H$_9$ |
| Ex. 14 | 1,1-bis(dioctylamino ethylene | —C$_8$H$_{17}$ | —C$_8$H$_{17}$ | —C$_8$H$_{17}$ | —C$_8$H$_{17}$ |
| Ex. 15 | 1,1-bis(dicyclobutyl-amino)ethylene | —cyclobutyl | —cyclobutyl | —cyclobutyl | —cyclobutyl |
| Ex. 16 | 1,1-bis(dicyclohexyl-amino)ethylene | —cyclohexyl | —cyclohexyl | —cyclohexyl | —cyclohexyl |
| Ex. 17 | 1,1-bis(dicyclooctyl-amino)ethylene | —cyclooctyl | —cyclooctyl | —cyclooctyl | —cyclooctyl |
| Ex. 18 | 1,1-bis(dibenzylamino)ethylene | —CH$_2\phi$ | —CH$_2\phi$ | —CH$_2\phi$ | —CH$_2\phi$ |
| Ex. 19 | 1,1-bis(diphenethylamino)ethylene | —CH$_2$CH$_2\phi$ | —CH$_2$CH$_2\phi$ | —CH$_2$CH$_2\phi$ | —CH$_2$CH$_2\phi$ |
| Ex. 20 | 1,1-bis(ethylbutylamino)ethylene | —C$_2$H$_5$ | —C$_4$H$_9$ | —C$_2$H$_5$ | —C$_4$H$_9$ |
| Ex. 21 | 1,1-bis(methylcyclohexyl-amino)ethylene | —CH$_3$ | —Cyclohexyl | —CH$_3$ | —cyclohexyl |
| Ex. 22 | 1,1-bis(N—oxazolidinyl)ethylene | —N—oxazolidinyl | | —N—oxazolidinyl | |
| Ex. 23 | 1,1-bis(N—thiazolidinyl)ethylene | —N—thiazolidinyl | | —N—thiazolidinyl | |
| Ex. 24 | 1,1-bis[N—(4-methyl-piperazinyl)ethylene | —N(4-methylpiperazinyl) | | —N(4-methylpiperazinyl) | |
| Ex. 25 | 1,1-bis(N—hexahydroaze-pinyl)ethylene | —N—hexahydroazepinyl | | —N—hexahydroazepinyl | |

We claim:
1. A polyamide having the recurring unit

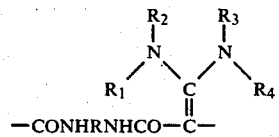

wherein R is a divalent hydrocarbon radical, $R_1$, $R_2$, $R_3$, and $R_4$ when taken separately are independently selected from the group consisting of lower alkyl, aralkyl, and cycloalkyl, and when taken together as $R_1$ with $R_2$ and $R_3$ with $R_4$ with the respective nitrogen atoms to which they are attached represent independently a heterocyclic group having from 5 to 7 ring atoms.

2. A polyamide according to claim 1 wherein R is a divalent arylene radical.

3. A polyamide according to claim 2 wherein R is 4,4'-methylenediphenylene.

4. A polyamide according to claim 1 wherein $R_1$, $R_2$, $R_3$, and $R_4$ are all the same and are lower alkyl.

5. A polyamide according to claim 1 wherein $R_1$ with $R_2$ and $R_3$ with $R_4$ taken together with their respective nitrogen atoms form the same heterocyclic groups having from 5 to 7 ring atoms.

6. A polyamide having the recurring unit

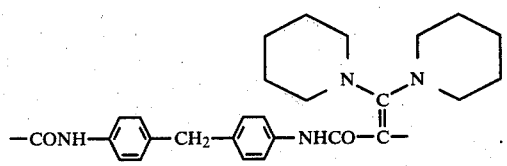

7. A polyamide having the recurring unit

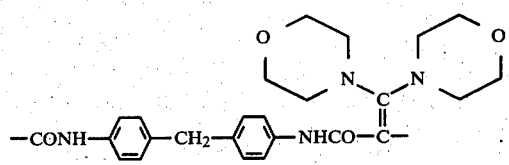

8. A polyamide having the recurring unit

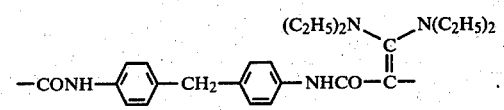

9. A polyamide having the recurring unit

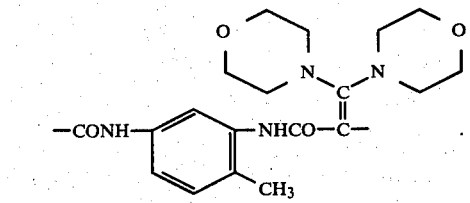

10. A process for the preparation of a polyamide as defined in claim 1 said process comprising bridging together under anhydrous conditions, A. a ketene-aminal having the formula

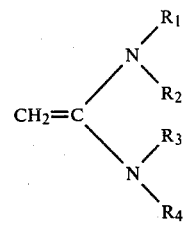

wherein $R_1$, $R_2$, $R_3$, and $R_4$ when taken separately are independently selected from the group consisting of lower alkyl, aralkyl, and cycloalkyl and when taken together as $R_1$ with $R_2$ and $R_3$ with $R_4$ with the respective nitrogen atoms to which they are attached represent independently a heterocyclic group having from 5 to 7 ring atoms; and B. an organic diisocyanate $R(NCO)_2$ wherein R is a divalent hydrocarbon radical wherein said ketene-aminal and said diisocyanate are present in substantially stoichiometric proportions.

11. A process according to claim 10 carried out in the presence of a dipolar aprotic solvent.

12. A process according to claim 10 wherein said reactants are brought together at a temperature of from about 20° C. to about 150° C.

13. A process according to claim 10 wherein said diisocyanate is an aromatic diisocyanate.

14. A process according to claim 13 wherein said diisocyanate is 4,4'-methylenebis(phenyl isocyanate).

15. A process for the preparation of a polyamide comprising bringing together in a dipolar aprotic solvent at a temperature of from about 20° C. to about 150° C. under anhydrous conditions, A. a ketene-aminal selected from the group consisting of 1,1-bis(N-piperidinyl)ethylene, 1,1-bis(N-pyrrolidinyl)ethylene, and 1,1-bis(N-morpholinyl)ethylene; and B. an aromatic diisocyanate, wherein said ketene-aminal and said diisocyanate are present in substantially stoichiometric proportions.

16. A process according to claim 15 wherein said ketene-aminal is 1,1-bis(N-piperidinyl)ethylene.

17. A process according to claim 15 wherein said ketene-aminal is 1,1-bis(N-morpholinyl)ethylene.

18. A process according to claim 16 or 17 wherein said diisocyanate is 4,4'-methylenebis(phenyl isocyanate).

* * * * *

UNITED STATES PATENT OFFICE
CERTIFICATE OF CORRECTION

Patent No. 4,338,428              Dated July 6, 1982

Inventor(s) Louis M. Alberino and Dale F. Regelman

It is certified that error appears in the above-identified patent and that said Letters Patent are hereby corrected as shown below:

Column 5, line 16 "such are" should read --such as--.
Column 6, line 48, that portion of the formula which reads "$\geq$" in two places should read --$>$-- in two places; lines 58 and 59 "1,1-bis(diphenylethylamino)ethylene" should read --1,1-bis(diphenethylamino)ethylene--. Column 7, lines 31 and 32 "1,4-cycolohexylenediisocyanate" should read --1,4-cyclohexylenediisocyanate--; line 41 "2,2-(4,4'-diisocyanatophenyl)-propane" should read --2,2-(4,4'-diisocyanatodiphenyl)propane--. Column 8, line 20 "(a kettle aminal)" should read --(a ketene aminal)--. Column 10, line 16 "fo" should read --for--; line 68 "developers" should read --develops--. Column 11, line 2 "the" should read --these--.

UNITED STATES PATENT OFFICE
CERTIFICATE OF CORRECTION

Patent No. 4,338,428            Dated July 6, 1982

Inventor(s) Louis M. Alberino and Dale F. Regelman

It is certified that error appears in the above-identified patent and that said Letters Patent are hereby corrected as shown below:

Columns 11 and 12, Table II, the heading reads for Ex. 12-25

"Ketene-aminal    $\underbrace{R_1 \qquad R_2}_{\text{taken together}}$    $\underbrace{R_3 \qquad R_4}_{\text{taken together}}$ "

the heading for Ex. 12-21 should read

--Ketene-aminal    $R_1$   $R_2$   $R_3$   $R_4$ -- and for Ex. 22-25 the heading should read

--Ketene-aminal    $\underbrace{R_1 \qquad R_2}_{\text{taken together}}$    $\underbrace{R_3 \qquad R_4}_{\text{taken together}}$ --.

Column 13, claim 10, line 47 "bridging" should read --bringing--.

Signed and Sealed this

Twenty-sixth Day of April 1983

[SEAL]

Attest:

GERALD J. MOSSINGHOFF

Attesting Officer     *Commissioner of Patents and Trademarks*